(12) United States Patent
Song

(10) Patent No.: US 6,957,323 B2
(45) Date of Patent: Oct. 18, 2005

(54) OPERAND FILE USING POINTERS AND REFERENCE COUNTERS AND A METHOD OF USE

(75) Inventor: Seungyoon Peter Song, East Palo Alto, CA (US)

(73) Assignee: Elan Research, Inc., Palo Alto, CA (US)

( * ) Notice: Subject to any disclaimer, the term of this patent is extended or adjusted under 35 U.S.C. 154(b) by 612 days.

(21) Appl. No.: 10/004,338

(22) Filed: Nov. 14, 2001

(65) Prior Publication Data

US 2003/0093652 A1 May 15, 2003

(51) Int. Cl.[7] .............................................. G08F 12/00
(52) U.S. Cl. ..................................................... 712/217
(58) Field of Search ........................................ 712/217

(56) References Cited

U.S. PATENT DOCUMENTS

| | | | | |
|---|---|---|---|---|
| 5,488,730 A | * | 1/1996 | Brown et al. ................. | 712/41 |
| 5,535,346 A | * | 7/1996 | Thomas, Jr. ................. | 712/217 |
| 6,167,508 A | * | 12/2000 | Farrell et al. ................ | 712/217 |
| 6,192,461 B1 | * | 2/2001 | Williamson et al. .......... | 712/23 |
| 6,237,082 B1 | * | 5/2001 | Witt et al. ................... | 712/215 |
| 6,240,503 B1 | * | 5/2001 | Witt ............................ | 712/23 |

* cited by examiner

*Primary Examiner*—Eric Coleman (74) *Attorney, Agent, or Firm*—Sawyer Law Group PLLC (57) ABSTRACT

This disclosure describes an operand file, a device that combines the functions of a register file, a reservation station, and a rename buffer into single storage element. The advantage of this mechanism is that it eliminates copying results and operands between the register file, reservation station, and rename buffer, thereby greatly simplifying the design and reducing area and power consumption. Furthermore, it can also be used in multithreaded processors that spawn children threads by copying some or all of the parent thread's registers to each of the children thread's registers.

30 Claims, 9 Drawing Sheets

OPERAND FILE USING POINTERS AND REFERENCE COUNTERS AND A METHOD OF USE

FIELD OF THE INVENTION

The present invention relates generally to a processing system and specifically to an operand file utilized within the processing system.

BACKGROUND OF THE INVENTION

Almost all processors are designed to operate in a pipeline; the simplest of which consists of the fetch, decode, and execute stages. Instructions are fetched (or read) from memory in the fetch stage. They are then decoded to determine what operations to perform on which operands in the decode stage. The actual operations are performed in the execute stage. Most high-performance processors use additional pipeline stages to increase the operating speed or the number of instructions that can be processed simultaneously (in one clock cycle) or to speculatively process instructions before it is known that these instructions are to be processed at all.

The results of executing instructions are stored in registers or in memory. The results that are used immediately or repeatedly are generally kept in registers, since registers can be accessed much faster than memory. The registers can be implemented using individual flip-flops or latches but are generally implemented using SRAM, known as a register file, to minimize the area occupied by the registers. A 32-bit processor with 16 general-purpose registers, for example, would use a register file consisting of SRAM organized as 16 words of at least 32 bits per word. A register file is designed to support multiple read and write operations per clock cycle. For instance, a register file may support four read and two write operations to sustain execution of two instructions in each cycle, assuming that the instructions use two operands and produce one result. Such a register file is said to have four read ports and two write ports. Processors may also have special-purpose registers that serve specific functions, such as keeping processor control and status information, providing debug or performance monitoring information, or aid in translating from virtual address to physical address. Although special-purpose registers may be better implemented as individual flip-flops and general-purpose registers in a register file, the same set of rules apply to reading and writing either type of registers, as described below.

If an instruction is executed before all instructions that are earlier in the program sequence have executed, its results must not be written to the specified register or memory if the processor is to provide a programming model known as precise exception. Such behavior is required when an earlier instruction produces an error condition, in which case the results of this "prematurely executed" instruction must be discarded without affecting any of the processor's registers or memory. To be exact, the processor must behave as if it executed all instructions that are earlier than the one causing the error and none of the instructions that are later than the one causing the error. The result of any prematurely executed instructions must, therefore, be kept in temporary storage.

Many processors use a rename buffer to hold these temporary results until it is safe to update the intended destination registers or memory with the results. The rename buffer is said to hold the future states—as opposed to the architectural state—because it contains the results that may or may not be updated to their intended destination registers or memory. As each instruction is executed in the program sequence and does not cause an error, its results can be safely and permanently copied to its specified memory or destination registers. Such an instruction is said to be completed and its destination registers are said to hold the architectural state. If an instruction causes an error, its results as well as the results of any prematurely executed instructions in the rename buffer are discarded.

Many high-performance processors execute a later instruction before executing an earlier one if the later instruction is ready to execute while the earlier one is not. They generally use an additional pipeline stage between the stages where the source operands are read and the instructions are executed. They use a reservation station to hold the instructions in this intermediate stage. As an instruction enters the reservation station, it obtains the source operands from the instruction itself for immediate operands or from memory, the register file or the rename buffer for register operands. If a source operand is not yet valid in memory, the register file or the rename buffer, it must be the destination of an earlier instruction that has not yet executed. When this earlier instruction is executed, its results are written to the rename buffer (assuming that all results are first written to the rename buffer before they are copied to memory or the register file) and to the source operand fields of the waiting instructions in the reservation station. The latter process is known as result forwarding, which allows the waiting instructions to obtain the source operands without reading memory, the rename buffer or register file.

Rename buffer is one of many names that refer to the storage elements used to hold future results until the results can be safely and permanently written to their intended destination registers or memory. Reservation station is also one of many names that refer to the storage elements used to hold the source operands of instructions waiting to be executed.

The advantage of operand file is that it eliminates copying results and operands between the register file, reservation station, and rename buffer, thereby greatly simplifying the design and reducing area and power consumption. Furthermore, it can also be used in multithreaded processors that spawn children threads by copying some or all of the parent thread's registers to each of the children thread's registers.

SUMMARY OF THE INVENTION

This disclosure describes an operand file, a device that combines the functions of a register file, a reservation station, and a rename buffer into single storage element. The advantage of this mechanism is that it eliminates copying results and operands between the register file, reservation station, and rename buffer, thereby greatly simplifying the design and reducing area and power consumption. Furthermore, it can also be used in multithreaded processors that spawn children threads by copying some or all of the parent thread's registers to each of the children thread's registers.

DETAILED DESCRIPTION

The present invention relates generally to a processing system and specifically to an operand file utilized within the processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

This disclosure describes an operand file, a device that combines the functions of a register file, a reservation station, and a rename buffer into single storage element.

Description of Operand File

Figure 1:
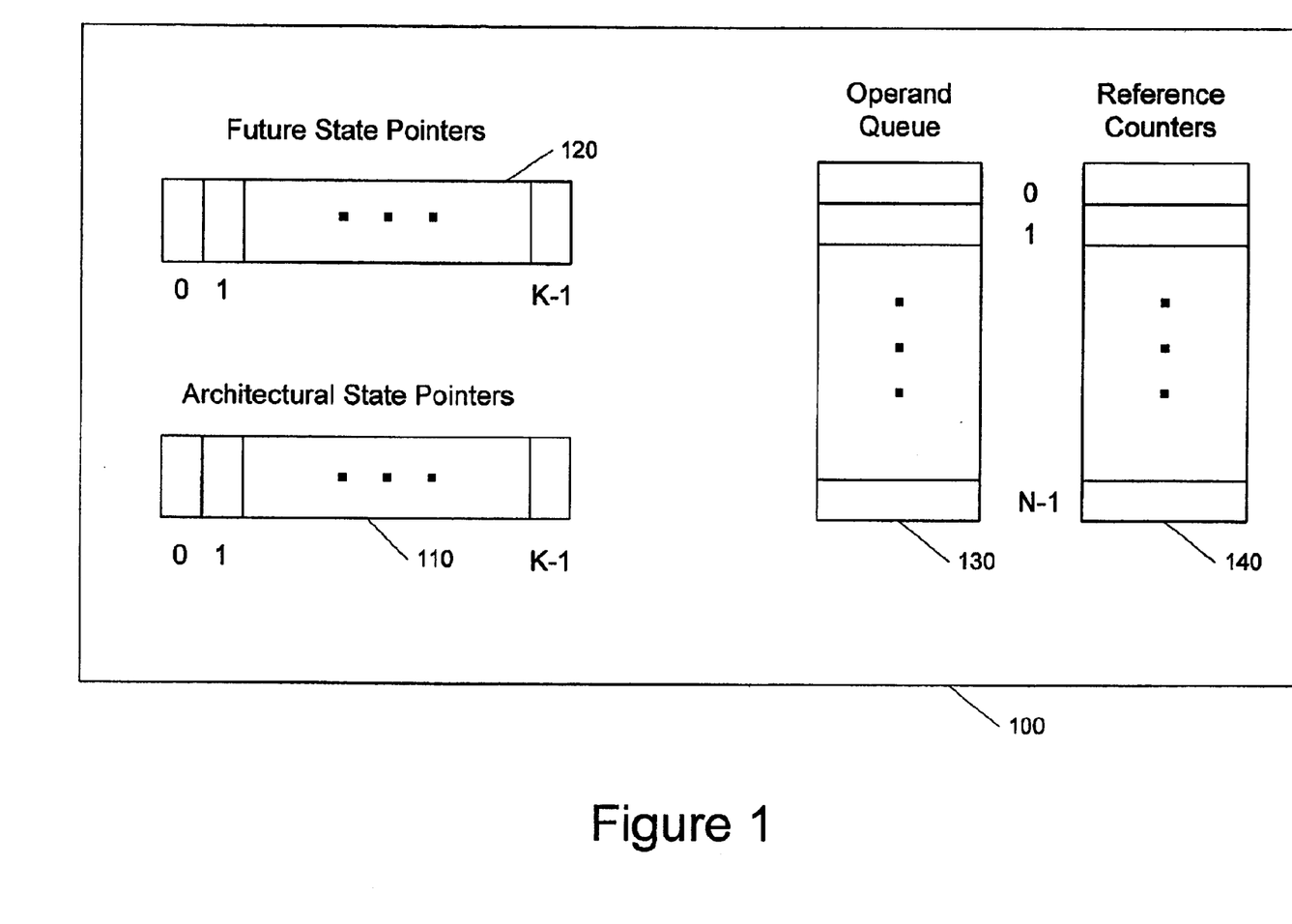
FIG. 1 illustrates an operand file in accordance with the present invention.

FIG. 1 illustrates an operand file 100 in accordance with the present invention. The operand file 100 comprises K number of architectural state pointers 110, K number of future state pointers 120, an N-entry operand queue 130, and N number of reference counters 140. K is the number of registers that can have future values, meaning instructions can prematurely execute and produce future values for these registers, and N is some number greater than K. Each of the K registers has an architectural state pointer and a corresponding future state pointer. The architectural state pointer identifies an entry in the operand queue that holds the architectural value of the register. That is, the entry has the result of the most recently completed instruction to modify the register. This instruction is not necessarily the most recently completed instruction. Similarly, the future state pointer identifies an entry in the operand queue that is assigned to hold the most recent future value of the register. That is, the entry is to hold the result of the most recently decoded instruction to modify the register. This instruction is not necessarily the most recently decoded instruction. In summary, the operand file works as follows. When an instruction that modifies a destination register is decoded, a free operand queue entry is assigned to hold the future value of the destination register by writing the free entry number into the register's future state pointer and incrementing the reference counter associated with the free entry by 1. A free entry has the reference count of 0, indicating no register is referencing this entry. When there is not a free entry, the instruction is stalled until one becomes free. When this instruction is executed, its result is written to the operand queue entry assigned at decode. When the instruction is completed, the operand queue entry number is written to the destination register's architectural state pointer. The reference count of the entry that was previously assigned to the destination register (the entry number that was kept in the destination register's architectural state pointer before it was written with the new entry number) is decremented by 1. In most cases, the decremented reference count becomes 0, indicating that the associated entry is now free.

When an instruction that reads a source register is decoded, the entry number kept in the source register's future state pointer is given to the instruction. When the instruction is ready to execute, it reads the source register's value from this operand queue entry. When an instruction that copies one register to another (a common mnemonic for such an instruction is MOVE Rd, Rs), the operand queue entry number kept in the source register's future state pointer is copied to the destination register's future state pointer. In addition, the reference count associated with the entry in the source register's future state pointer is incremented by 1, since another register—the destination register of the move instruction—is referencing the entry. Using the operand file, a register copy instruction is effectively executed when the entry number in the source register's future state pointer is copied to the destination register's future state pointer and the entry's reference count is incremented. When the move instruction is completed, the entry number in the source register's architectural state pointer is copied to the destination register's architectural state pointer. In addition, the reference count associated with the entry that was previously assigned to the destination register is decremented by 1.

The operand file 100 is now described in detail. The N-entry operand queue 130 can be implemented as a collection of flip-flops or latches. It is best implemented as a typical register file, however, having multiple read and write ports and being organized as N entries of W bits/entry. Instructions'source operands are read using the read ports and the instructions' results are written using the write ports. Any immediate operands that are specified within the instructions can also be written to the operand queue 130—at any time before the instructions read the source operands from the operand queue 130—so that they can be read back along with other source operands. The operand queue 130 should have more entries than the number of registers, since it can be used to hold immediate operands as well as the registers' future and architectural values. The width of the operand queue 130 is the same or larger than the width of the processor. That is, for a 32-bit processor, W is 32 or larger.

The reference counter 140 is associated with each of the entries in the operand queue 130. It indicates the total number of registers whose architectural or future value is kept in the associated operand queue entry. For instance, if the reference count for entry 2 is 3, there are total of 3 registers whose result is kept in entry 2. Obviously, all three registers must have the same value. The reference counter 140 may also indicate that the associated operand queue entry holds an immediate operand. When the reference count is 0, the associated entry is free since it is not being referenced by any register or holding an immediate operand.

Figure 2:
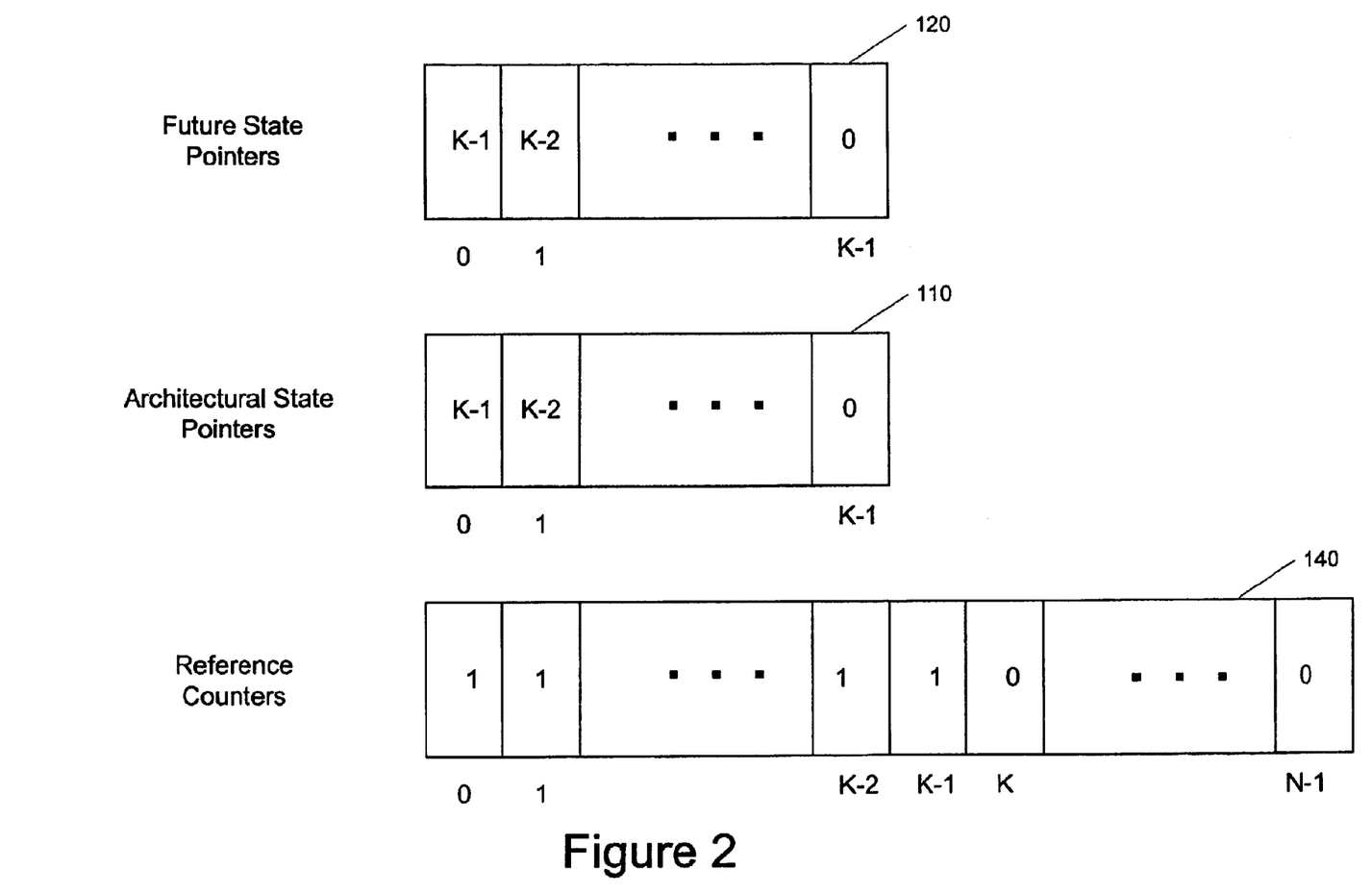
FIG. 2 illustrates each of the first K operand queue entries being assigned to each of the K registers.
Figure 3:
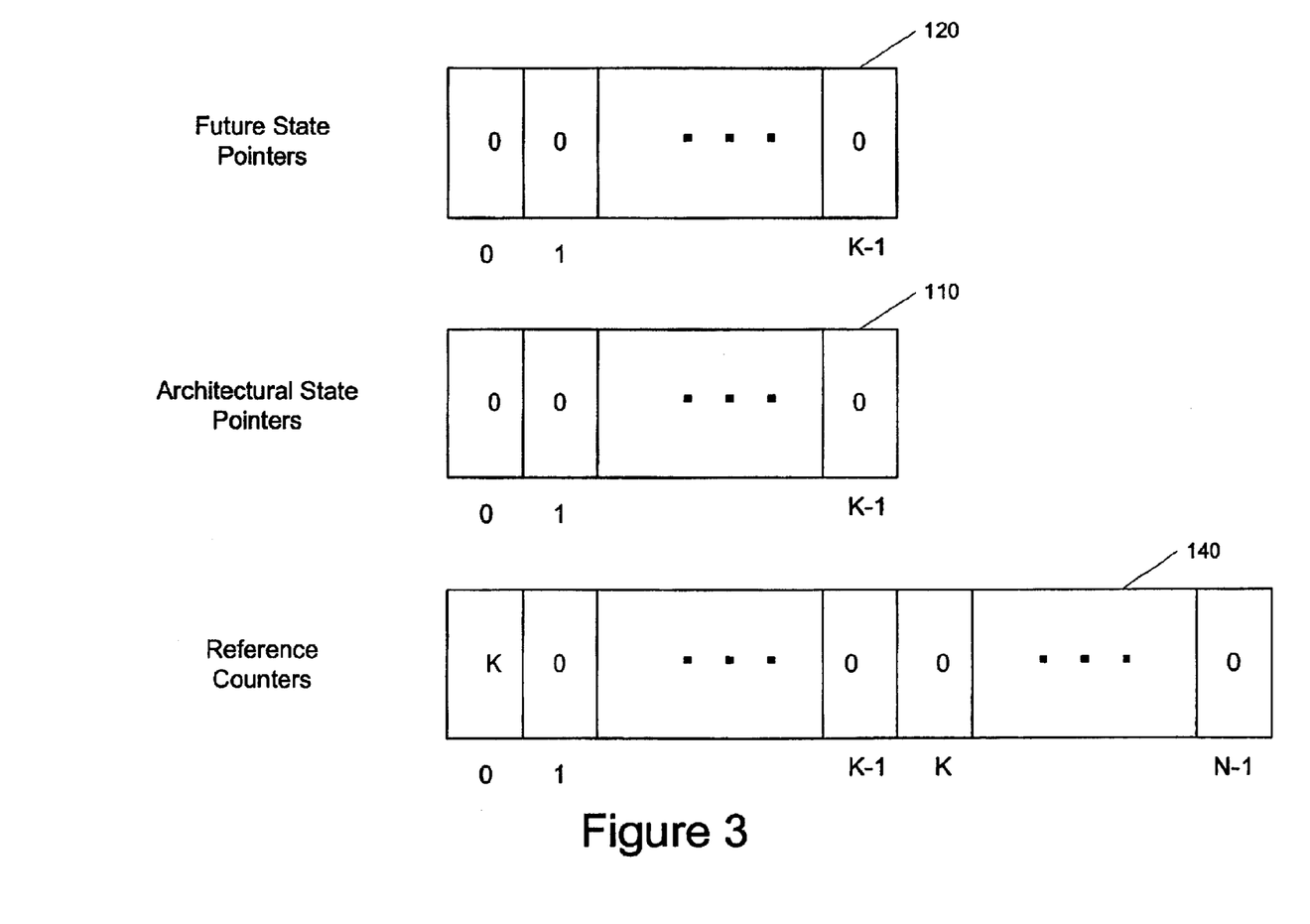
FIG. 3 illustrates if all K registers have undefined value upon reset, all K registers can be mapped to one, say the first, entry in the operand queue.

Upon a reset, the architectural state pointers 110, the future state pointers 120, and the reference counters 140 are initialized using one of the two schemes. In the first scheme, each register is assigned its own operand queue entry. For example, FIG. 2 illustrates each of the first K operand queue entries being assigned to each of the K registers. This requires each of the K architectural state pointers 110 to be initialized with unique operand queue entry number, ranging from 0 to K−1. Each future state pointer 120 is initialized with the same value as its associated architectural state pointer. The reference count for the first K operand queue entries are set to 1, indicating that the associated entry is being referenced by one register. If a register has a defined value upon reset, the entry assigned to the register must be initialized with that defined value. In the second scheme, all registers that have undefined value upon reset are mapped to one (or more) operand queue entry and each of the remaining registers that have defined values upon reset is assigned its own operand queue entry. For example, FIG. 3 illustrates if all K registers have undefined value upon reset, all K registers can be mapped to one, say the first, entry in the operand queue. Each of the architectural and future state pointers 110 and 120 would be initialized to 0, denoting the first entry in the operand queue, and the first entry's reference count would be initialized to K. The reference count of the remaining operand queue entries would be initialized to 0.

Figure 4:
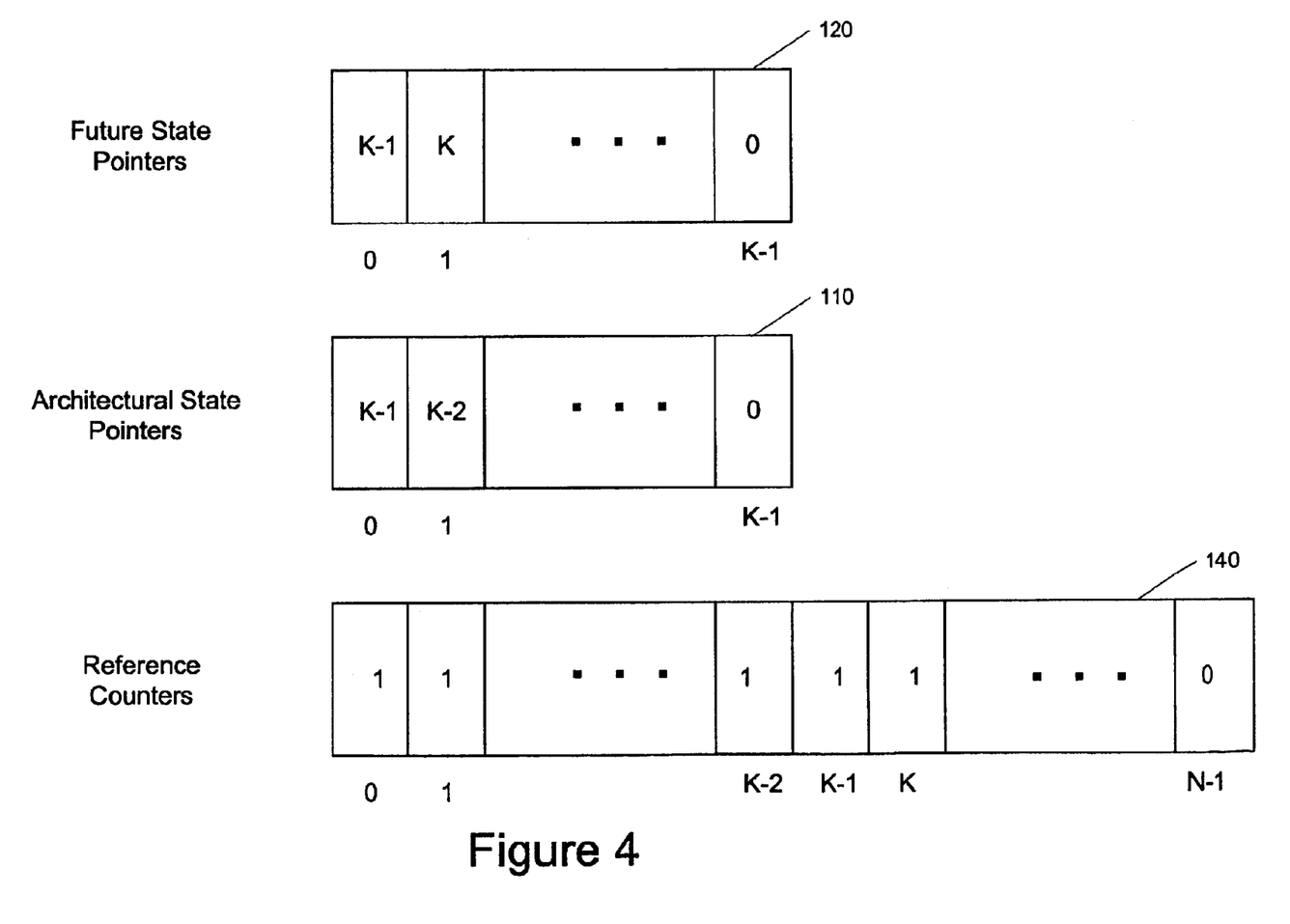
FIG. 4 illustrates assigning the $K^{th}$ operand queue entry to destination register R1 by writing K to R1's future state pointer and incrementing the associated reference count.
Figure 5:
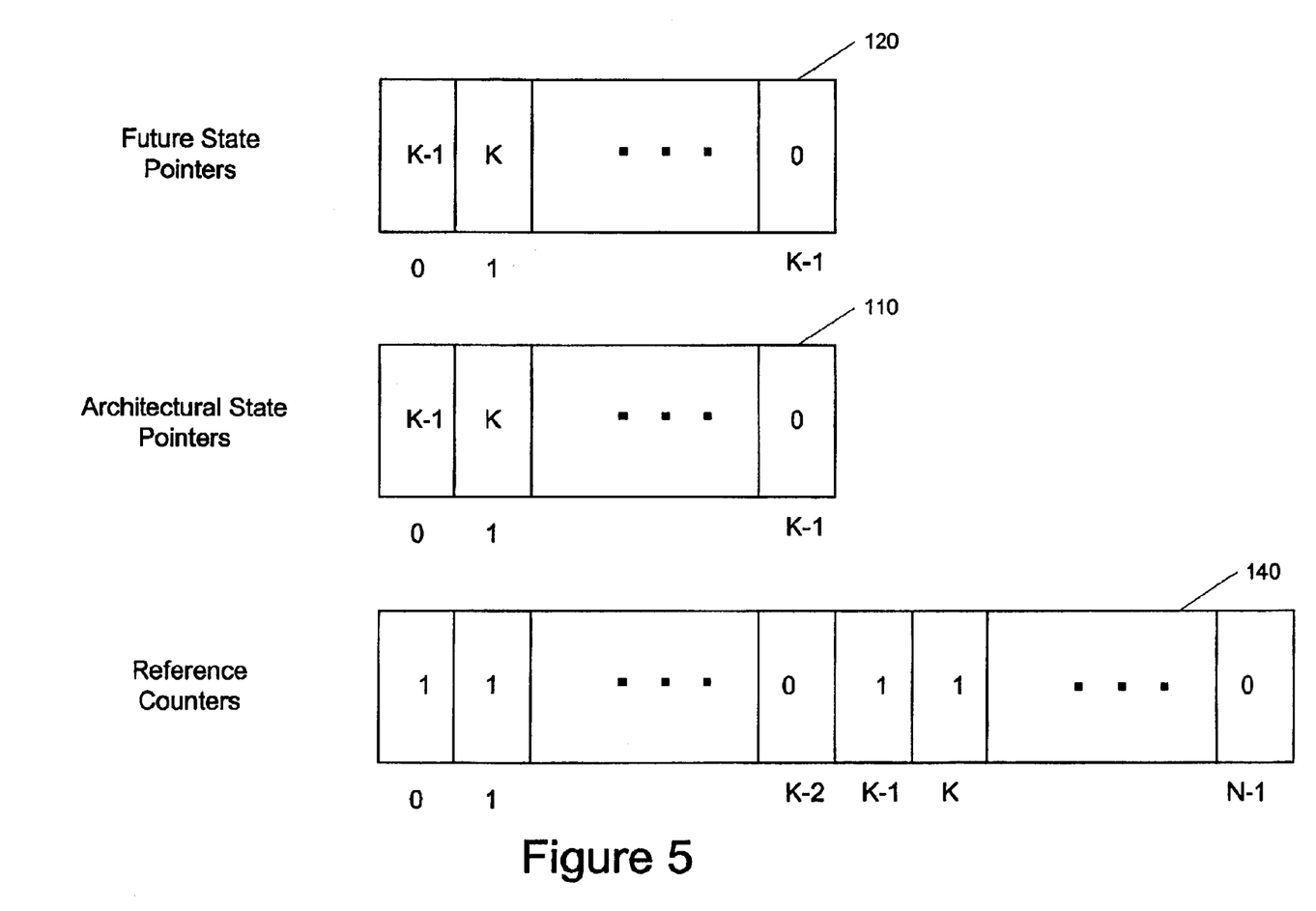
FIG. 5 illustrates the reference count of K-$2^{nd}$ entry being decremented by 1 when an instruction that updates R1 is completed, since K-$2^{nd}$ entry was previously assigned to the destination register R1.

When an instruction having a destination register is decoded, a free operand queue entry is identified and the entry number is written to the destination register's future state pointer 120. For example, if the instruction specifies R1 as a destination register, and the $K^{th}$ operand queue entry is free, the R1's future state pointer 120 is written with the entry number K and the reference count of the $K^{th}$ entry is incremented by 1. This change is shown in FIG. 4, using FIG. 2 as the basis. When this instruction executes and produces a result, its result is written to the $K^{th}$ entry of the operand queue. When the instruction is completed, K is written to the R1's architectural state pointer while the reference count of the entry previously assigned to R1 is decremented by 1. That is, the reference count of $K-2^{nd}$ entry is decremented by 1, as shown in FIG. 5, since $K-2^{nd}$ entry was previously assigned to R1. There are two ways to determine which entry was previously assigned to a destination register. In one implementation, the destination register's architectural state pointer can be read before it is written with the new entry number. In another implementation, the destination register's future state pointer can be read at decode and kept with the instruction until the instruction is completed.

When an instruction having a source register is decoded, data for the source register is to be found at the operand queue entry indicated in the source register's future state pointer. This entry number is given to the instruction so that it can read the operand queue entry when it is ready to execute. For instance, if the instruction specifies R0 as a source register, and the future state pointer for R0 has K−1, then the data to be used for R0 is located at the $K-1^{th}$ operand queue entry.

Figure 6:
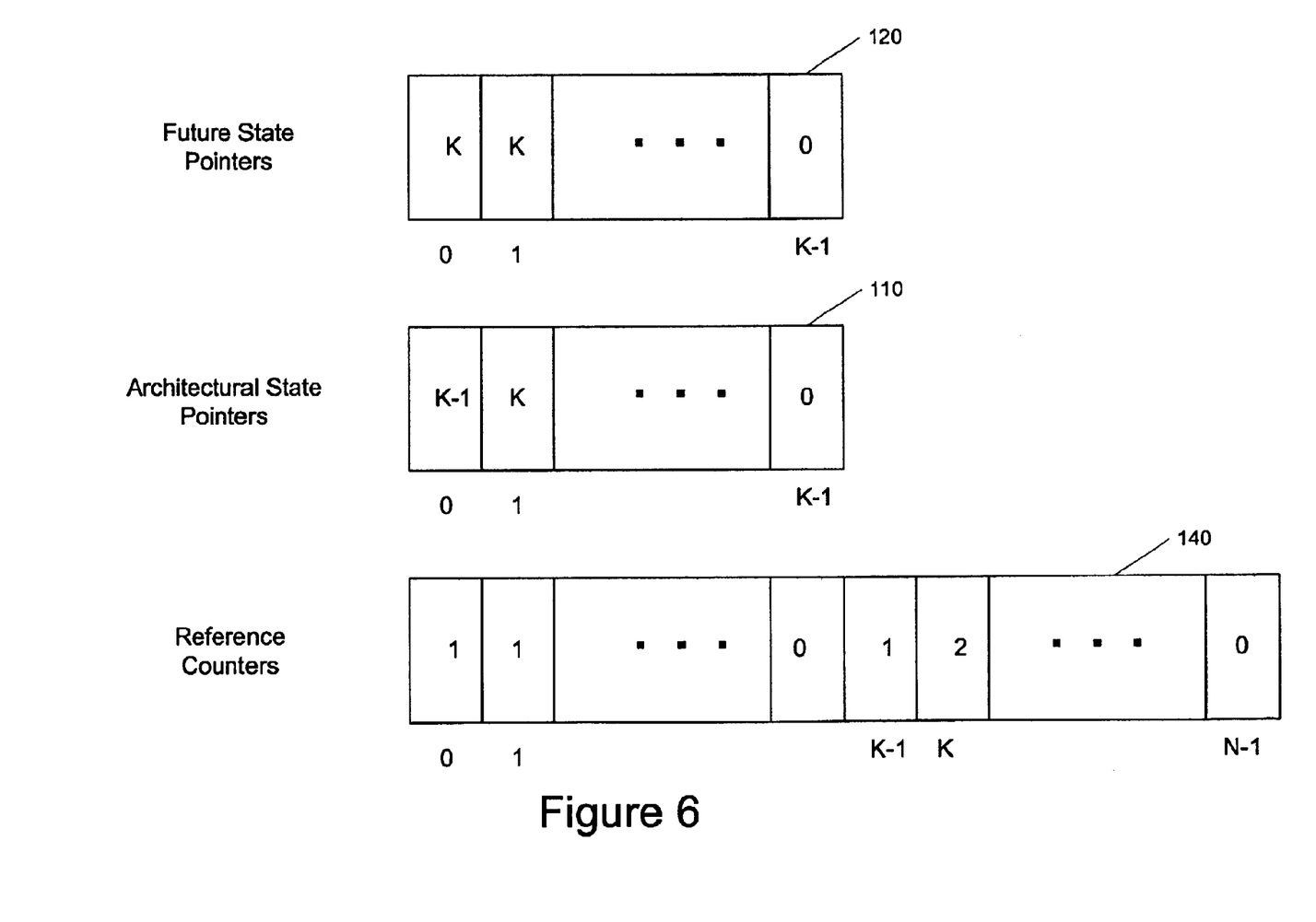
FIG. 6 illustrates executing an instruction that copies R1 to R0 by copying the operand queue entry number in R1's future state pointer to the R0's future state pointer and incrementing the reference count of the associated operand queue entry, which is K.
Figure 7:
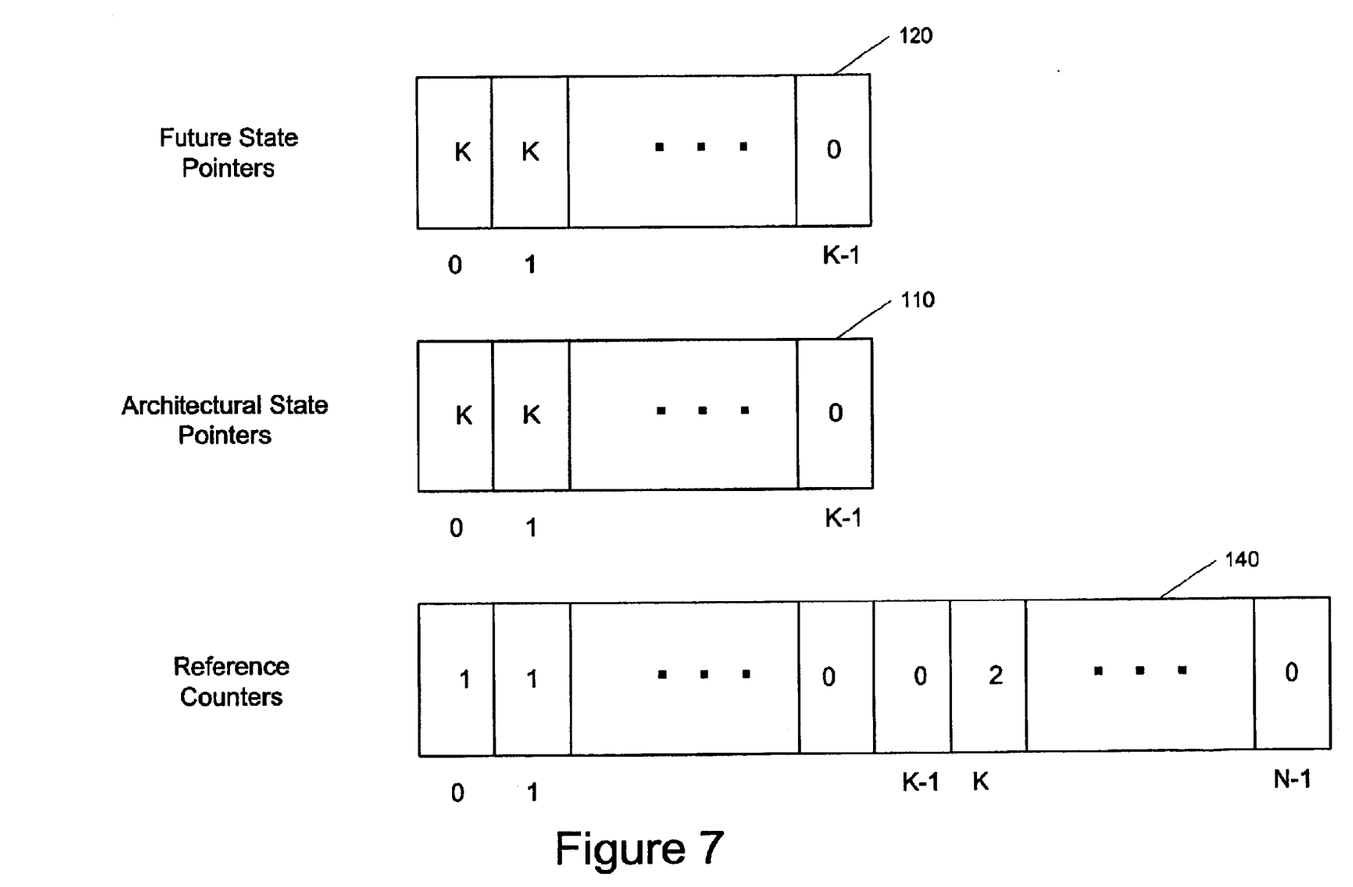
FIG. 7 illustrates completing an instruction that copies R1 to R0 by writing the new operand queue entry number, which is K, into the R0's architectural state pointer and decrementing the reference count associated with the operand queue entry previously assigned to R0, which is K−1.

When a register copy instruction is decoded, the instruction is actually executed by copying the entry number in the source register's future state pointer to the destination register's future state pointer and incrementing the entry's reference count by 1. For example, when an instruction that copies from R1 to R0 is decoded and R1's future state pointer has K, as shown in FIG. 5, K would be written to the R0's future state pointer and the $K^{th}$ reference count would be incremented by 1, as shown in FIG. 6. The $K^{th}$ reference count is now 2, since R0's and R1's future state pointers are referencing it. Incidentally, R1's future state pointer is same as its architectural state pointer in the example, since there is no pending instruction that will modify R1. When the register copy instruction is completed, K is written to R0's architectural state pointer and the $K-1^{th}$ reference count is decremented by 1, as shown in FIG. 7, since $K-1^{th}$ entry was previously assigned to the destination register R0 before this register copy instruction was completed.

If an instruction specifies an immediate operand, then the immediate data can also be written to a "free" operand queue entry. For instance, when an instruction specifying an immediate operand is decoded and the $K+1^{th}$ operand queue entry is free, the $K+1^{th}$ entry could be assigned to hold the immediate value. The reference count of the $K+1^{th}$ entry is incremented by 1 but the future or architectural state pointers are not changed. The $K+1^{th}$ entry number is given to the instruction so that it can read the immediate value from the operand queue along with any other source operands it may have. The immediate value can be written to the operand queue at anytime before the associated instruction reads it. Alternatively, the associated instruction cannot read its immediate operand until the immediate operand is first written to the operand queue. At anytime after the immediate operand becomes no longer needed, the entry could be freed by decrementing the associated reference count. In one implementation, the reference count could be decremented as soon as the immediate operand is read from the operand queue, effectively freeing the entry. In another implementation, the reference count could be decremented when the associated instruction is completed.

When an instruction to be completed next incurred an exception, the processor must stop completing instructions from the current instruction sequence and start executing instructions from the exception handler program. This requires adjusting the operand file so that it appears as if the instruction causing the exception has not yet altered it. Specifically, the future state pointers and the reference counters must be restored to the values they had just before the instruction causing the exception is decoded. In one implementation, each architectural state pointer is copied to its corresponding future state pointer and all pending instructions that must be discarded are designated "cancelled". There are many known ways to identify and designate instructions to be cancelled, and how this is done is irrelevant to the operation of the operand file, provided that all instructions, including those designated "cancelled", are processed by the instruction completion stage. When the completion stage processes an instruction to be cancelled, the destination register's architectural state pointer is not altered but the reference count associated with the entry assigned to the destination register is decremented by 1.

Note that, if this instruction were to be completed and not cancelled, the reference count of the entry assigned previously to the destination would be decremented by 1. If the instruction to be cancelled has an immediate operand, the entry assigned to hold the immediate operand must also be decremented by 1. When all cancelled instructions are processed and no new instructions are decoded, the reference counts are restored to their values before any of the cancelled instructions were decoded. Once the future state pointers are restored in one cycle, however, instructions from the exception handler program can be decoded and executed while the cancelled instructions are being processed.

The number of bits needed for the reference counters can be kept to minimum while taking the full of advantage of the operand file's efficient register copying mechanism. In an implementation with K number of registers, it is possible for a reference count to become greater than K. For example, decoding K+1 number of register copy instructions, all specifying the same source register, could make the reference count to reach K+1 before the first such instruction is completed. However, such instruction sequence is useless and occurs extremely rarely. A preferred implementation is to use a few, say 2, bits for each reference counter. When a register copy instruction is decoded and the associated reference count is already at the maximum value, or 3 in this example, a free entry is assigned to hold the destination register's future value instead of copying the entry number from the source register's future state pointer. In this case, the instruction doesn't use the operand file's efficient register copy mechanism and, therefore, must be executed to physical copy the content of its source register to its destination register. The preferred implementation can be simplified further by disabling the operand file's register copy mechanism whenever any reference counter has reached its maximum.

When a free entry is assigned to hold a register or an immediate value, it may be desirable to simply write the value of 1 to the associated reference counter instead of incrementing the reference count from 0 to 1.

Incidentally, there are many ways to implement the reference counters, or counters in general. The most common approach, which is assumed in this disclosure, is to use natural numbers (numbers 0, 1, 2, ... and so on) and add 1 to increment and subtract 1 to decrement. One can also define an arbitrary counting sequence for the reference counters and use a state machine to implement the counting sequence. For example, one can define 2-bit reference counters to count in the sequence of 2, 0, 3, and 1, with the value 2 denoting "free" entry.

Using Operand File in Multithreaded Processors

Multithreaded processors can be viewed as a tightly coupled set of single-threaded processors that share certain "thread-independent" resources, such as multiply and floating-point units or caches, in executing simultaneously related or unrelated sequence of instructions. The operand file is well suited to support multithreaded processors that dynamically create and terminate threads. The U.S. Pat. No. 5,812,811, entitled "Executing Speculative Parallel Instructions Threads with Forking and Inter-Thread Communication" and assigned to International Business Machines Corporation, describes such a processor in detail.

The operand file efficiently supports creating a thread, which closely resembles what needs to happen upon a reset. The registers that have undefined value upon creation can all be assigned to one free entry in the operand queue by writing the entry's number into the registers' architectural and future pointers. The reference count of this entry is incremented by the number of registers with undefined values. Each of the registers that have defined value upon creation must be assigned a unique entry in the operand queue. How this is done is described previously. In some situations, some or all registers of a thread, known as the parent thread, are copied to the corresponding registers of a new thread being created, known as a child thread. The operand file efficiently supports this by copying the entry numbers kept in the parent thread's architectural (or future) state pointers to the child thread's architectural (and future) state pointers and incrementing the associated reference counters, all of which can be done in one cycle. This mechanism is much more efficient and easier to implement than using known register files or rename buffers since the contents of the registers are not copied to the target thread. If creating a child thread requires copying the registers' contents, a thread having 32 registers would require a register file and/or rename buffer with 32 read and 32 write ports to do this in one cycle.

Figure 8:
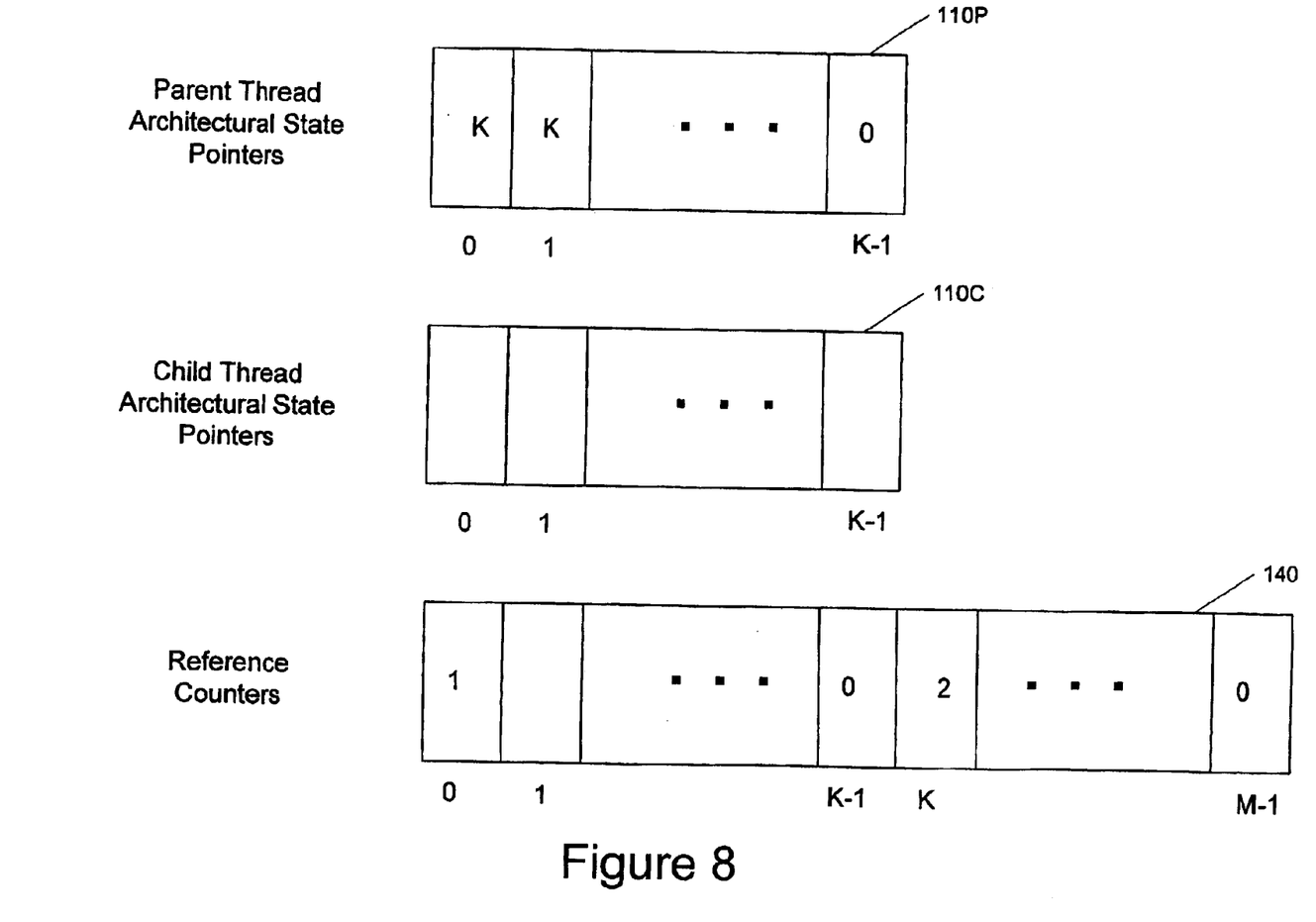
FIG. 8 illustrates the parent thread's R0 and R1 referring to the $K^{th}$ entry while Rk−1 refers to the $0^{th}$ entry.
Figure 9:
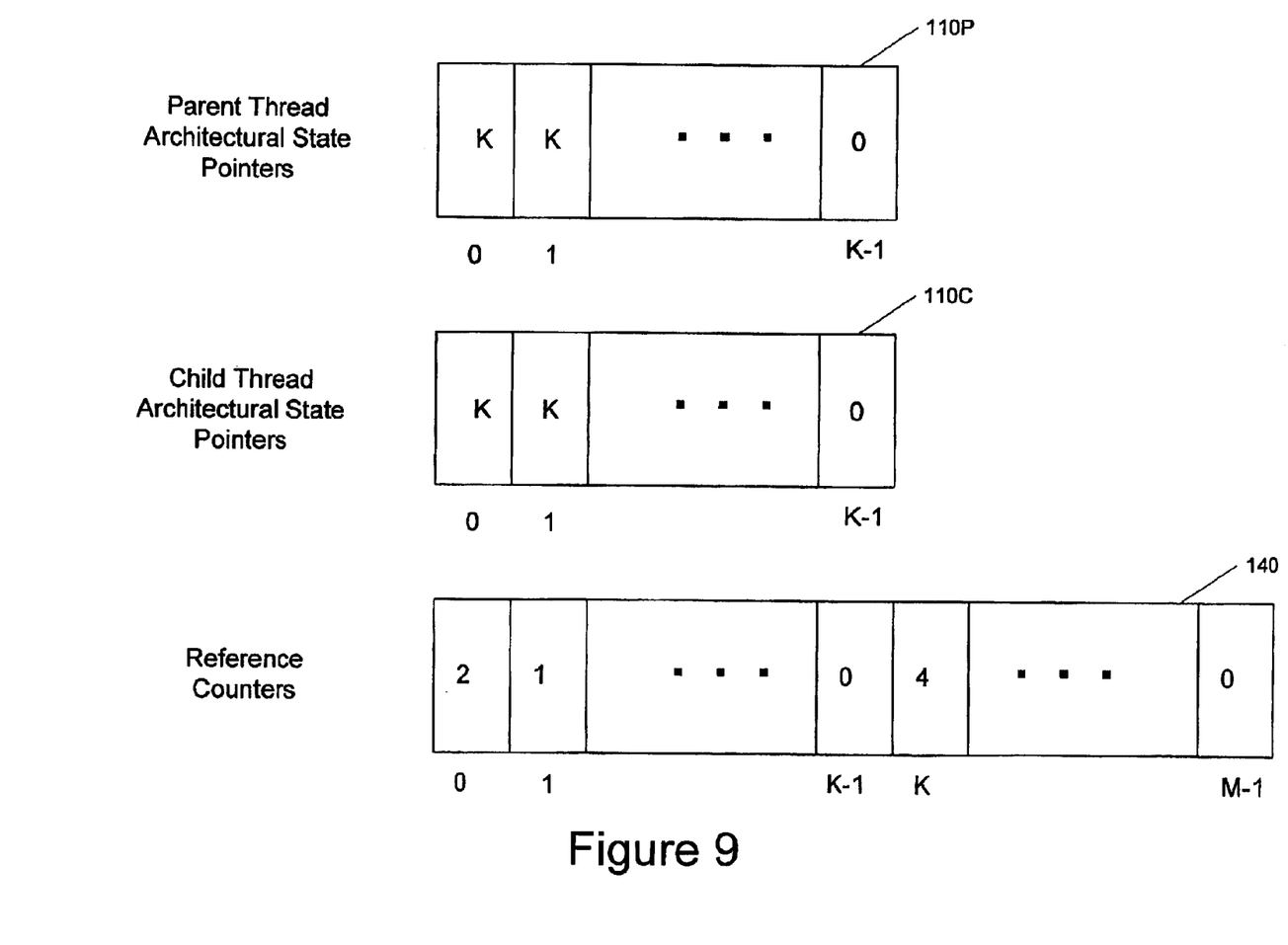
FIG. 9 illustrates copying the registers R0, R1 and Rk−1 from the parent thread to the corresponding registers in a child thread by copying the parent thread's architectural state pointers to the associated architectural state pointer of the child's thread and incrementing the associated reference counts.

The process of copying registers for creating a child thread is described with an example. FIGS. 8 and 9 show K architectural state pointers for two threads and M number of reference counters, associated with a M-entry operand queue. To simplify the discussion, assume that the parent thread's architectural register values are to be copied to the child thread's registers. Since the operand file is shared by two threads, M should be some number greater than 2K. To copy all K registers from the parent thread to the child thread, the operand queue entry in each of the parent thread's architectural state pointers is copied to the corresponding architectural state pointer in the child thread. This can be done in one cycle without requiring much hardware since each pointer consists of a few bits. In addition, the reference count associated with each entry in the architectural state pointers is incremented by 1. In the example shown in FIG. 8, the parent thread's R0 and R1 refer to the $K^{th}$ entry while Rk−1 refers to the $0^{th}$ entry. The reference counts of the $K^{th}$ and $0^{th}$ entry are 2 and 1, respectively. After the register copy operation, the child thread's R0 and R1 pointers refer to the $K^{th}$ entry and Rk−1 pointer refers to the $0^{th}$ entry, same as the parent thread's pointers. The $K^{th}$ reference count is now 4, since two more registers from the child thread reference the $K^{th}$ entry. Similarly, the $0^{th}$ reference count is now 2. The newly created thread's future state pointers have the same values as the architectural state pointers since there are no outstanding instructions.

The previous example on FIGS. and 8 and 9 assume that thread creation occurs when the thread-creating instruction is the next instruction to complete. A more efficient way to create a child thread and copy some or all of the parent thread's registers to corresponding child thread's registers is when the thread-creating instruction is at the decode stage. In this case there may be outstanding instructions, which are the instructions that appear earlier in program order than the thread-creating instruction and that have not completed. To provide the precise exception model of programming, the thread-creating instruction must execute after all of the outstanding instructions have completed without incurring an exception. When the thread-creating instruction is decoded, the instruction is stalled until it is determined that none of the outstanding instructions can cause an exception. Then, the contents of the parent thread's future state pointers, and not the architectural state pointers as in the previous example, are copied to the child thread's architectural and future state pointers. The parent thread's future state pointers may hold different values than its architectural state pointers at this point, due to outstanding instructions, but the two sets of the pointers will have the same values when all of the outstanding instructions are completed without incurring an exception. This scheme allows the child thread to be created earlier than waiting until the thread-creating instruction is the next instruction to complete.

When a thread is terminated, any shared resources assigned to it can be freed to improve resource utilization. Terminating a thread is similar to processing an exception condition, as now described. When a thread is to be terminated, any outstanding instructions must be cancelled, using the mechanisms discussed previously. Specifically, as each cancelled instruction is processed, the reference count associated with the entry assigned to the destination register or an immediate operand is decremented by 1. The architectural state pointers are not modified. When all outstanding instructions have been processed, any operand queue entries the thread holds can be freed simply by decrementing the reference count associated with each of the register's architectural state pointers. Those entries whose reference count becomes 0 naturally become free.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system that maps a number of registers to at least one associated operand queue entry, the system comprising an operand file further comprising:

at least one pair of future state and architecture state pointers;

an operand queue including at least one entry; and a reference counter associated with each operand queue entry, whose count indicates the number of registers mapped to the at least one associated operand queue entry.

2. The operand file of claim 1, in which a free operand queue entry is assigned to hold a future value of a register of an instruction by writing the free entry's number into the register's future state pointer and incrementing the free entry's reference point.

3. The operand file of claim 2, in which the assigned entry number is written to the register's architectural state pointer and the reference count of the entry previously assigned to the register is decremented upon completion of the instruction.

4. The operand file of claim 3, in which each register is assigned a unique operand queue entry upon a reset.

5. The operand file of claim 3, in which all registers that have undefined value upon reset are assigned to at least one operand queue entry and each of the registers that have defined value upon reset is assigned a unique entry upon a reset.

6. The operand file of claim 3, in which the entity number previously assigned to the register is obtained from the register's future state pointer.

7. The operand file of claim 3, in which the entry number previously assigned to the register is obtained from the register's architectural state pointer.

8. The operand file of claim 3, in which each of the architectural state pointer is copied to its corresponding future state pointer when processing an exception condition.

9. The operand file of claim 3, in which a cancelled instruction does not modify associated architectural state pointers but the reference count of the entry assigned to the register is documented.

10. The operand file of claim 3, in which a register-copy instruction is executed by copying the operand queue entry number in a source register's future state pointer to a destination register's future state pointer and incrementing the reference count of the associated entry.

11. The operand file of claim 10, in which a register-copy instruction is completed by copying the operand queue entry number in the source register's architectural state pointer to the destination register's architectural state pointer and decrementing the reference count of the entry previously assigned to the destination register.

12. The operand file of claim 10, in which a register-copy instruction is completed by reading the operand queue entry number in the destination register's future state pointer at decode time and writing the entry number to the destination register's architectural state pointer and decrementing the reference count of the entry previously assigned to the destination register.

13. The operand file of claim 10, in which a register-copy instruction copies the future value of the source register to the operand queue entry assigned to the destination register when the reference count of the entry in the source register's future state pointer is at its maximum value.

14. The operand file of claim 10, in which a register-copy instruction copies the future value of the source register to the operand query entry assigned to the destination register when the reference count of any entry is at its maximum value.

15. The operand file of claim 1, in which an immediate operand is assigned a free operand query entry by incrementing the reference count of the free entry.

16. The operand file of claim 15, in which the immediate operand is written to the operand queue at any time before the associated instruction needs to read the operand file.

17. The operand file of claim 16, in which the entry assigned to the immediate operand is decremented when the associated instruction is completed.

18. The operand file of claim 16, in which a cancelled instruction with an immediate operand does not modify associated architectural state pointers but the reference count of the entry assigned to hold the immediate operand is decremented.

19. The operand file of claim 16, in which the entry assigned to the immediate operand is decremented as soon as the immediate operand is read.

20. The operand file of claim 3 in which each thread in a multithreaded processor has its own set of architectural and future state pointers but shares one operand queue.

21. The operand file of claim 20 in which all registers that have undefined values in a thread is assigned to at least one free operand queue entry by writing the at least one free entry's number into the thread's architectural and future state pointers and incrementing the at least one entry's reference count by the number of registers.

22. The operand file of claim 20 in which a register in a first thread is copied to a register in a second thread by copying the operand queue entry number in the architectural state pointer of the register in the first thread to the architectural and future state pointers of the register in the second thread and incrementing the reference count of the associated operand queue entry.

23. The operand file of claim 20 in which a register in a first thread is copied to a register in a second thread by copying the operand queue entry number in the future state pointer of the register in the first thread to the architectural and future state pointers of the register in the second thread and incrementing the reference count of the associated operand queue entry.

24. The operand file of claim 20 in which the reference count of the entry in each of a thread's architectural state pointer is decremented by 1 upon terminating the thread.

25. A computer that maps a number of registers to at least one associated operand queue entry, the computer adapted to include an operand file, the operand file comprising:

at least one pair of future state and architecture state pointers;

an operand queue including at least one entry; and a reference counter associated with each operand queue entry, whose count indicates the number of registers mapped to the at least one associated operand queue entry.

26. The computer of claim 25, in which all registers that have undefined value upon reset are assigned to at least one operand queue entry and each of the registers that have defined value upon reset is assigned a unique entry upon a reset.

27. The computer of claim 25, in which each register is assigned a unique operand queue entry upon a reset.

28. The computer of claim 25, in which a free operand queue entry is assigned to hold a future value of a register of an instruction by writing the free entry's number into the register's future state pointer and incrementing the free entry's reference count.

29. The computer of claim 28, in which the assigned entry number is written to the register's architectural state pointer and the reference count of the entry previously assigned to the register is decremented upon completion of the instruction.

30. An operand file comprising:

at least one pair of future state and architecture state pointers;

an operand queue including at least one entry; and a reference counter associated with each operand queue entry, in which a free operand queue entry is assigned to hold a future value of a register of an instruction by writing the free entry's number into the register's future state pointer and incrementing the free entry's reference point, in which the assigned entry number is written to the register's architectural state pointer and the reference count of the entry previously assigned to the register is decremented upon completion of the instruction, and in which a register-copy instruction is executed by copying the operand queue entry number in a source register's future state pointer to a destination register's future state pointer and incrementing the reference count of the associated entry.

* * * * *